(12) United States Patent
Manthiram et al.

(10) Patent No.: US 6,331,282 B1
(45) Date of Patent: Dec. 18, 2001

(54) MANGANESE OXYIODIDES AND THEIR METHOD OF PREPARATION AND USE IN ENERGY STORAGE

(75) Inventors: Arumugam Manthiram; Jaekook Kim, both of Austin, TX (US)

(73) Assignee: Board of Regents, The University of Texas System

(*) Notice: Subject to any disclaimer, the term of this patent is extended or adjusted under 35 U.S.C. 154(b) by 0 days.

(21) Appl. No.: 09/189,446

(22) Filed: Nov. 10, 1998

Related U.S. Application Data

(60) Provisional application No. 60/064,786, filed on Nov. 10, 1997.

(51) Int. Cl.[7] .................................................. C01G 45/12
(52) U.S. Cl. ......................... 423/599; 252/506; 252/511; 252/519.1; 252/519.3; 361/502
(58) Field of Search .................................... lp;1p252/506, 252/ 511, 519.1, 519.3; 423/599; 361/502

(56) References Cited

U.S. PATENT DOCUMENTS

| | | | |
|---|---|---|---|
| 4,133,856 | 1/1979 | Ikeda et al. | 264/63 |
| 5,079,674 | 1/1992 | Malaspina | 361/502 |
| 5,156,934 | 10/1992 | Kainthia et al. | 429/224 |
| 5,419,986 | 5/1995 | Kainthia et al. | 429/224 |
| 5,658,355 | 8/1997 | Cottevieille et al. | 29/25.03 |
| 5,680,685 | 10/1997 | Bischoff | 29/25.24 |

OTHER PUBLICATIONS

Armstrong and Bruce, "Synthesis of layered LiMnO$_2$ as an electrode for rechargeable lithium batteries," *Nature*, 381:499–500, 1996.

Burke and Murphy, "Material characteristics and the performance of electrochemical capaccitors for electric/hybrid vehicle applications," *Mat. Res. Soc. Symp., Proc.* 393:375–395, 1995.

Carbon supercapacitors, from the internet at website: http://www.syd.dcet.csiro.au/Dec94–c.html.

Conway, "Transition from 'Supercapacitor' to 'battery' behavior in electrochemical energy storage," *J. Electrochem. Soc.*, 138:1539–1543, 1991.

Gummow et al., "Lithium extraction from orthorhombic lithium manganese oxide and the phase transformation to spinel," *Mat. Res. Bull.*, 28:1249–1257, 1993.

Idota et al., "Tin–based amorphous oxide: A high–capacity lithium–ion–storage material," *Science*, 276:1395–1397, 1997.

Kim and Manthiram, "A manganese oxyiodide cathode for rechageable lithium batteries," *Nature*, 390:265–267, 1997.

Leroux et al., "The 2D rancieite–type manganic acid and its alkali–exchanged derivatives: Part I—Chemical characterization and thermal behavior," *Solid State Ionics*, 80:299–306, 1995.

Manthiram and Tsang, "Synthesis of amorphous MoO$_{2+\delta}$ and its electrode performance in lithium batteries," *J. Electrochem. Soc.*, 143(7):L143–L145, 1996.

Manthiram et al., "New route to reduced transition–metal oxides," *Chem. Mat.*, 6:1601–1602, 1994.

(List continued on next page.)

*Primary Examiner*—Yogendra N. Gupta
*Assistant Examiner*—Derrick G. Hamlin
(74) *Attorney, Agent, or Firm*—Fulbright & Jaworski, LLP

(57) ABSTRACT

A method for synthesizing a manganese oxyiodide, including the steps of reducing sodium permanganate by lithium iodide at ambient temperature to obtain the manganese oxyiodide, and annealing the manganese oxyiodide at an elevated temperature. Such a manganese oxyiodide may be used for energy conversion and storage, particularly for battery and supercapacitor applications.

35 Claims, 5 Drawing Sheets

OTHER PUBLICATIONS

Nagaura and Tazawa, *Prog. Batteries Sol. Cells*, 9:209–217, 1990.

Oyama et al., "Dimercaptan–polyaniline composite electrodes for lithium batteries with high energy density," *Nature*, 373:598–600, 1995.

Rechargable batteries, from the internet at website: http://www.cellular-battery.com/battery_inforamtion.htm. 1998.

Sato et al., "A mechanism of lithium storage in disordered carbons," *Science*, 264:556–558, 1994.

Scrosati, "Lithium rocking chair batteries: An old concept?" *J. Electrochem. Soc.*, 139(10):2776–2781, 1992.

Scrosati, "Challenge of portable power," *Nature*, 373:557–558, 1995.

Stein et al., "Turning down the heat: Design and mechanism in solid–state synthesis," *Science*, 259:1558–1564, 1993.

Tarascon et al., "Synthesis conditions and oxygen stoichiometry effects on Li insertion into the spinel $LiMn_2O_4$," *J. Electrochem. Soc.*, 141(6):1421–1431, 1994.

Thackery et al., "Structural fatigue in spinel electrodes in high voltage (4V) $Li/Li_2Mn_xO_4$ cells," *Electrochem. Solid State Lett.*, 1(1):7–9, 1998.

Thackeray et al., "Lithium insertion into manganese spinels," *Mat. Res. Bull.*, 18:461–472, 1983.

Thackeray, "Structural considerations of layered and spinel lithiated oxides for lithium ion batteries," *J. Electrochem. Soc.*, 142(8):2558–2563, 1995.

Tsang and Manthiram, "A new route for the synthesis of $LiMn_2O_4$ cathode: variation of composition, microstructure, and electrochemical behavior with synthesis temperature," *Solid State Ionics*, 89:305–312, 1996.

Tsang and Manthiram, "Synthesis of nanocrystallin $VO_2$ and its electrochemical behavior in lithium batteries," *J. Electrochem. Soc.*, 144(2):520–524, 1997.

Vitins and West, "Lithium intercalation into layered $LiMnO_2$," *J. Electrochem. Soc.*, 144(8):2587–2592, 1997.

Vogel, *In: A Textbook of Quantitative Inorganic Analysis: Theory and Practice*, Longmans, Green and Co., London, pp 348–349, 1955.

Xu et al., "Amorphous manganese dioxide: A high capacity lithium intercalation host," *Electrochem. Solid State Lett.*, 1(1):1–3, 1998.

Zheng and Jow, "A new charge storage mechanism for electrochemical capacitors," *J. Electrochem. Soc.*, 142(1):L6–L8, 1995.

Zheng et al., "Hydrous ruthenium oxide as an electrode material for electrochemical capacitors," *J. Electrochem. Soc.*, 142(8):2699–2703, 1995.

MANGANESE OXYIODIDES AND THEIR METHOD OF PREPARATION AND USE IN ENERGY STORAGE

This application claims priority to provisional patent application Ser. No. 60/064,786 filed Nov. 10, 1997, entitled "Method of Preparing Manganese Oxyiodide and Manganese Oxyiodide Apparatus," by Jaekook Kim and Arumugam Manthiram. The entire text of the above-referenced disclosure is specifically incorporated by reference herein without disclaimer.

The United States government may have specific rights in this invention pursuant to Grant No. DMR-9401999 awarded by the National Science Foundation.

BACKGROUND OF THE INVENTION

1. Field of the Invention

The present invention relates to compositions useful for energy conversion and storage. More specifically, the present invention relates to the synthesis of manganese oxyiodides useful for high energy density battery and electrochemical capacitor (supercapacitor) applications.

2. Description of Related Art

Miniaturization in electronics and rapid advances in portable devices have created increasing demand for lightweight, compact, high energy density batteries (Scrosati, 1995). Lithium batteries offer higher energy density and longer shelf life compared to other rechargeable systems (Scrosati, 1995; Oyama et al., 1995). Although layered $LiCoO_2$ may be used as a cathode in commercially available lithium-ion cells (Nagaura and Tazawa, 1990; Scrosati, 1992), Co is costly and toxic.

Manganese oxides are attractive in this regard because Mn is inexpensive and less toxic. Although spinel $LiMn_2O_4$ has been pursued intensively as a cathode, its capacity fading on cycling due to Jahn-Telier distortion poses problems (Thackeray et al., 1983; Tarascon et al., 1994; Thackeray et al., 1998). Attempts to develop other crystalline manganese oxides have largely been unsuccessful because nonspinel oxides tend to transform to the more stable spinel phase on cycling (Gummow et al., 1993; Armstrong et al., 1996; Vitins et al., 1995). For instance, layered $LiMnO_2$ tends to transform to a spinel phase and exhibits unsatisfactory capacity fading.

Recently, hydrated amorphous manganese oxides employing an aqueous medium have been reported (Xu et al., 1998). Although such oxides exhibit a high capacity, the capacity tends to decline to about 78% in 10 cycles. Because cyclability data is only available for 10 cycles, the stability of these water-containing cathodes upon prolonged cycling remains unclear.

Complex metal oxides used for energy storage devices are traditionally made by repeated grinding and firing of raw materials at elevated temperatures in order to overcome diffusional limitations. Such a "brute force", high-temperature approach often leads to unfavorable characteristics such as larger grain size, lower surface area, and an inaccessibility of metastable phases that may have unusual valences or atomic arrangements. These drawbacks have created interest in recent years in designing low temperature routes to synthesize complex materials (Stein et al., 1993).

It has been shown (Manthiram et al., 1994) that alkali metal borohydrides such as $NaBH_4$ can be used effectively to reduce metalate ions $(MO_4)^{n-}$(M=V, Mo and W) in aqueous solutions to obtain binary oxides $M_yO_z$ and ternary oxides $Na_xM_yO_z$. The method gave amorphous or nanocrystalline phases, which were often metastable, and the binary oxides such as $VO_2$ and $MoO_2$ obtained by this approach were found to be attractive as electrode materials for lithium batteries (Tsang and Manthiram, 1997; Manthiram and Tsang, 1996). However, these aqueous-based methods often give hydrated products, and complete removal of water while still maintaining an amorphous structure is difficult.

SUMMARY OF THE INVENTION

The present invention involves a low temperature chemical method to synthesize amorphous or nearly amorphous manganese oxyiodides having a general formula of $Li_wNa_xMnO_yI_z$. The process typically involves the reduction of an acetonitrile solution of sodium permanganate by lithium iodide at room temperature followed by annealing at elevated temperatures in vacuum. The values of w, x, y and z in $Li_wNa_xMnO_yI_z$ depend on ratios of reactants and the annealing conditions, and with benefit of this disclosure may be varied by those skilled in the art to achieve compositions having desired properties. In one embodiment, the disclosed composition shows excellent performance as positive electrodes (cathodes) in rechargeable lithium batteries. The electrochemical characteristics of the samples also suggest possible use in electrochemical capacitor (supercapacitor) applications.

The disclosed compositions utilize environmentally benign and typically less-expensive manganese. Advantageously, in one embodiment, the manganese oxyiodide electrodes described herein may exhibit more than 95% of cell capacity below 4 V, which is particularly useful in avoiding electrolyte instability as polymer electrolytes may decompose above 4 V. In this embodiment, samples may exhibit a substantially smooth discharge-charge curve without any abrupt changes, which is an attractive feature to avoid problems associated with over-charge or discharge.

Operating voltage ranges of the presently disclosed compositions may be particularly attractive for lithium-ion batteries, lithium polymer batteries, or supercapacitors. The disclosed compositions may offer an amorphous or nearly amorphous structure with smaller particle size that may provide an easier access to lithium ions from an electrolyte, thereby providing better lithium ion diffusion and rate capability. Although in one embodiment the disclosed manganese oxyiodides may offer a lower voltage, their larger capacity with a mid-discharge voltage of about 2.6 V leads to an energy density that is about 1.4 times higher than those achieved practically with layered $LiCoO_2$ or spinet $LiMn_2O_4$ cathodes.

In a broad aspect, the invention is a method for synthesizing a manganese oxyiodide including combining a permanganate with a reducing agent to form the manganese oxyiodide.

In other aspects, the method may include annealing the manganese oxyiodide. The annealing may include heating the manganese oxyiodide to a temperature of between about 100° C. and about 300° C. The annealing may occur under vacuum conditions and may take place for between about 2 hours and about 3 days. The annealing may include heating the manganese oxyiodide under vacuum conditions for about 10 hours to a temperature of about 250° C. Combining the permanganate with the reducing agent may occur at ambient temperature, and it may occur in a nonaqueous medium. The permanganate may include an alkali metal permanganate salt. It may include at least one of sodium permanganate, lithium permanganate, potassium permanganate, or a mitre thereof It may include sodium permanganate. The reducing agent may include an alkali metal iodide. It may include an alkali metal borohydride. It may include at least one of lithium iodide, sodium iodide, potassium iodide, sodium borohydride, lithium borohydride, potassium borohydride, or a mixture thereof The reducing agent may also include lithium iodide. The permanganate and the reducing agent may be combined in a molar ratio of from about 1:0.5 to about 1:10.

In another aspect, the invention is a method for preparing a composition including combining an alkali metal permanganate salt with an alkali metal iodide in a nonaqueous medium to form a manganese oxyiodide. The alkali metal permanganate salt and the alkali metal iodide may be combined in a molar ratio of from about 1:0.5 to about 1:10. The method also includes heating the manganese oxyiodide under vacuum conditions to a temperature of between about 100° C. and about 300° C. to form the composition.

In other aspects, the manganese oxyiodide may be heated for between about 2 hours and about 3 days. The alkali metal permanganate salt may include sodium permanganate. The alkali metal iodide may include lithium iodide. The non-aqueous medium may include acetonitrile. The alkali metal permanganate salt and the alkali metal iodide may be combined in a molar ratio of about 1:1.5.

In another aspect, the invention is a method for forming an electrode including combining a permanganate with a reducing agent to obtain a manganese oxyiodide, heating the manganese oxyiodide; and grinding the manganese oxyiodide to form the electrode.

In other aspects, the permanganate may include an alkali metal permanganate salt. The permanganate may include sodium permanganate. The reducing agent may include an alkali metal iodide. The reducing agent may include lithium iodide. The combining of the permanganate with the reducing agent may occur in a nonaqueous medium. The non-aqueous medium may include at least one of alcohol, acetonitrile, or mixtures thereof. The method may also include mixing the manganese oxyiodide with a conducting material, which may include carbon. The method may also include mixing the manganese oxyiodide with a binding material. The grinding of the manganese oxyiodide to form the electrode may include ball milling. The manganese oxyiodide may be ball milled with between about 5 weight percent carbon and about 40 weight percent carbon. The manganese oxyiodide may be ball milled with about 25 weight percent carbon. The method may also include ball milling the manganese oxyiodide with between about 1 weight percent and about 20 weight percent polytetrafluoroethylene. The method may include ball milling the manganese oxyiodide with about 5 weight percent polytetrafluoroethylene.

In another aspect, the invention is a composition including $Li_wNa_xMnO_yI_z$, where the w is between about 0.0 and about 5.0, the x is between about 0.0 and about 5.0, the y is between about 1.0 and about 4.5, and the z is between about 0.0 and about 3.0.

In another aspect, the invention is a composition comprising $Li_wNa_xMnO_yI_z$, wherein said w is between about 0.5 and about 3.25, said x is between about 0.01 and about 1.0, said y is between about 2.4 and about 3.6, and said z is between about 0.01 and about 0.4.

In other aspects, the composition may also include between about 5 weight percent carbon and about 40 weight percent carbon and between about 1 weight percent polytetrafluoroethylene and about 20 weight percent polytetrafluoroethylene. The w may be about 1.5, the x may be about 0.5, the y may be about 2.85, and the z may be about 0.12. The $Li_wNa_xMnO_yI_z$ may be amorphous. The $Li_wNa_xMnO_yI_z$ may be semi-crystalline.

In another aspect, the invention is a battery including $Li_wNa_xMnO_yI_z$, where the w is between about 0.5 and about 3.25, the x is between about 0.01 and about 1.0, the y is between about 2.4 and about 3.6, and the z is between about 0.01 and about 0.4. In other aspects, the battery may include a battery housing, one or more electrodes including the recomposition, and an electrolyte.

The another aspect, the invention is a capacitor including $Li_wNa_xMnO_yI_z$, where the w is between about 0.5 and about 3.25, the x is between about 0.01 and about 1.0, the y is between about 2.4 and about 3.6, and the z is between about 0.01 and about 0.4. In other aspects, the capacitor may include a capacitor housing, and one or more electrode layers including the composition.

DESCRIPTION OF ILLUSTRATIVE EMBODIMENTS

Figure 1A:
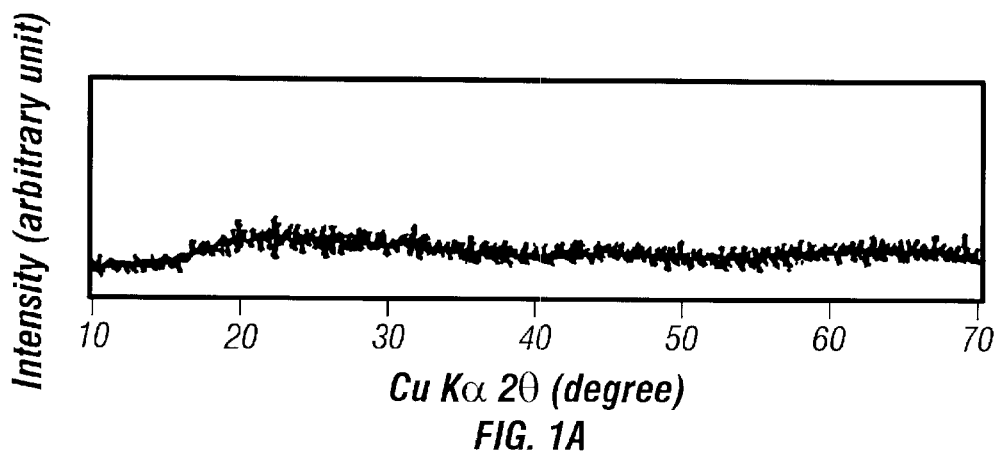
FIG. 1 shows X-ray powder diffraction patterns of a manganese oxyiodide according to one embodiment of the present disclosure obtained by reducing permanganate with LiI: (a) as-prepared, (b) after heating in vacuum at 250° C., and (c) after heating in air at 600° C. The planes marked in (c) refer to $Li_2MnO_3$, and the asterisks refer to $Na_{0.7}MnO_2$.

An exemplary embodiment of the presently disclosed method and composition comprises a low temperature, typically below about 300° C., synthesis of a manganese oxyiodide that is useful for energy conversion and storage devices such as batteries and supercapacitors. In an exemplary embodiment, the synthesized manganese oxyiodide may be amorphous, nearly amorphous, or semicrystalline. As used herein, "nearly amorphous" or "semicrystalline" refer to states which may exhibit some limited short range order. The electrochemical performance of synthesized manganese oxyiodide depends upon its composition, which in tur depends, in part, upon molar ratios within a reaction mixture and annealing conditions. In one embodiment, manganese oxyiodide prepared in accordance with the present disclosure exhibits a capacity of about 335, about 275, and about 220 mAh/g, respectively, at current densities of 0.05, 0.5, and 1 mA/cm$^2$ in the voltage range 4.3 to 1.5 V. Such a composition exhibits about a 100% capacity retention.

In one embodiment, a permanganate ion $(MnO_4)^-$ is combined with a reducing agent to synthesize a manganese oxyiodide. The combining may be done at ambient temperature. The reducing agent may be a lithium iodide. Alternatively, the reducing agent may be one or more suitable alkali metal iodides, including, but not limited to, sodium iodide, potassium iodide, or mroures thereof. The reducing agent may also be one or more suitable alkali metal borohydrides, including, but not limited to sodium borohydride, potassium borohydride, lithium borohydride, or mixtures thereof The permanganate ion may come from a sodium permanganate salt. Alternatively, the permanganate ion may come from one or more suitable alkali metal permanganate salts, including, but not limited to, potassium permanganate, lithium permanganate, or mixtures thereof In one embodiment, the reducing agent may be combined with permanganate ion in a nonaqueous medium, which allows for the preparation of compositions which are free or substantially free from water. In one embodiment, the nonaqueous medium may be made up of acetonitrile. Alternatively, nonaqueous medium may include another suitable substance such as alcohol.

In one embodiment, $NaMnO_4H_2O$ may be heated to obtain anhydrous sodium permanganate, $NaMnO_4$, prior to reaction with a reducing agent. In this regard, heating may be performed at any temperature and/or for any time suitable for forming anhydrous permanganate. For example, a temperature of from about 100° C. to about 200° C. for a time period of from about 1 hour to about 10 hours may be employed. A $NaMnO_4$ solution may be prepared by dissolving the anhydrous sodium permanganate in a nonaqueous medium such as acetonitrile. Varying amounts of anhydrous LiI may be added at ambient temperature, under constant agitation, to the nonaqueous $NaMnO_4$ solution so that the $NaMnO_4$ to LiI molar ratio may be adjusted as desired. As used herein, "agitation" refers to any suitable form of general agitation, including, but not limited to, stirring, mixing, magnetic stirring, shaking, blending, etc. In one embodiment, a $NaMnO_4$ to LiI molar ratio of from about 1:0.5 to about 1:10, and alternatively about 1:1.5, is employed. However, it is contemplated that alternative, suitable molar ratios may be employed, including ratios outside a range 1:0.5–1:10. In this regard, with benefit of this disclosure, those of skill in the art will understand that compositions having varied molar ratios may be prepared by varying the reactant concentrations and/or reaction conditions. Following combination, the resulting mixture may be kept under constant agitation for any period of time suitable for forming manganese oxyiodide. However, in one embodiment agitation time is greater than about 10 hours, and alternatively ranges from greater than about 10 hours to about 1 day. Manganese oxyiodide formed from the reaction may be filtered and washed several times with acetonitrile or another suitable substance known in the art to remove iodine formed during the reduction process.

Synthesized manganese oxyiodide may optionally be annealed, for example, at an elevated temperature. In this case, the heating process tends to remove residual solvent, such as acetonitrile, or any adsorbed water which may impair electrochemical performance. Heating also appears to beneficially affect electrochemical characteristics of the sample. With the benefit of this disclosure, those of skill in the art will understand that any annealing temperature suitable for removing residual water and solvents may be employed. However, in one embodiment, the sample may be heated to a temperature of between about 100° C. to about 300° C., and typically to about 250° C. Although temperatures greater than about 300° C. and less than about 100° C. may be employed if desired, it has been observed that in some cases, heating to temperatures greater than about 300° C. may lead to the formation of unfavorable crystalline phases, while heating to temperatures below about 100° C. may not sufficiently remove solvent materials. Annealing times may be varied as desired. A sample may be heated for about 2 hours to about 3 days, and typically for about 10 hours. Heating may take place under various conditions (e.g., in an air or a nitrogen atmosphere), but is typically performed under vacuum conditions.

Electrodes for use in energy storage and conversion devices, including batteries and supercapacitors, may be fabricated by combining a permanganate with a reducing agent to obtain a manganese oxyiodide. In one embodiment, the disclosed manganese oxyiodide compositions may be heated and may be further processed by, for example, grinding to form an electrode. As used herein, "grinding" refers to mixing, crushing, pulverizing, pressing together, polishing, reducing to powder or small fragments, milling, ball milling, or any other suitable process to wear down a material. A conducting material may be mixed with the manganese oxyiodide in the process of forming an electrode. The conducting material may be an electrically conductive material such as carbon, which may be in the form graphite or acetylene black, but it will be understood with benefit of this disclosure that the conducting material may alternatively be any other suitable material or mixtures of suitable materials known in the art.

In one embodiment, manganese oxyiodide is prepared in accordance with the present disclosure. For example, it may be vacuum annealed at about 250° C. for about 10 hours. In one embodiment, the synthesized manganese oxyiodide may be mixed in a mortar and pestle or ball milled, as known in the art, with between about 5 weight percent and about 40 weight percent carbon, typically about 25 weight percent fine carbon. Mixing may be performed for various intervals of time, and in this case, about 40 minutes. It will be understood that mixing times may be varied as desired to suit particular mixing processes and product specifications. Synthesized manganese oxyiodide may also be mixed with a binding material including, but not limited to, polytetrafluoroethylene (PTFE). In one embodiment, between about 1 and about 20 weight percent PTFE, and typically about 5 weight percent PTFE may be used as a binding material and may be mixed with a synthesized manganese oxyiodide in a mortar and pestle or ball milled. It is contemplated that other binding materials known in the art may be substituted for PTFE.

With the benefit of this disclosure, the mixed, crushed, and/or ground materials may be fabricated into one or more electrodes for energy conversion and storage according to procedures known in this regard to those skilled in the art. An example of forming a battery electrode and battery is described in U.S. Pat. No. 5,419,986 which is incorporated herein by reference in its entirety. An example of forming a capacitor is described in U.S. Pat. No. 5,680,685 which is incorporated herein by reference in its entirety. Information relating to supercapacitors may be found in Conway (1991), Zheng and Jow (1995), Zheng, Cygan, and Jow (1995), and Burke and Murphy (1995), which are all incorporated herein by reference in their entirety.

Electrodes may be formed in a variety of shapes, sizes, and/or configurations as is known in the art. In one embodiment, electrodes may be formed by rolling a mixture of synthesized manganese oxyiodide, conducting material, and binding material into one or more thin sheets which may be cut to form, for example, circular electrodes having an area of about 2 cm$^2$ with a thickness of about 0.2 mm and a mass of about 0.06 g. Electrochemical performance of such electrodes may be evaluated according to procedures known in the art. In one embodiment, electrochemical performance of such electrodes may be evaluated with coin-type cells using metallic Li anode and LiClO$_4$ in propylene carbonate/1.2-dimethoxyethane as electrolyte.

The following examples are illustrative and should not be construed as limiting the scope of the invention or claims thereof.

EXAMPLE 1

Synthesis of Manganese Oxyiodide

NaMnO$_4$H$_2$O was heated at about 170° C. for about 2 hours to obtain anhydrous sodium permanganate, NaMnO$_4$. A number of 0.05 M NaMnO$_4$ solutions were then prepared by dissolving the anhydrous sodium permanganate in a nonaqueous medium of acetonitrile. Varying amount of anhydrous LiI was then added at ambient temperature, under constant agitation, to the nonaqueous NaMnO$_4$ solution to obtain NaMnO$_4$ to LiI molar ratios of from about 1:0.5 to about 1:10, as shown in Table 1. The resulting mixture was then kept under constant agitation for approximately 1 day. Manganese oxyiodide formed from the reaction was then filtered and washed several times with acetonitrile to remove iodine formed during the reduction process.

Energy Dispersive Spectroscopic (EDS) analysis reveals the presence of Mn, Na and I in as-prepared (i.e., before annealing) and vacuum-annealed manganese oxyiodides prepared in accordance with the present disclosure. In order to fully characterize a prepared manganese oxyiodide composition, Li, Na and Mn contents may be determined by Atomic Absorption Spectroscopy after dissolving the sample in dilute hydrochloric acid. Iodine content may be determined by oxidizing the iodide to iodine with hydrogen peroxide in a 2N sulfuric acid solution (Vogel, 1955). Liberated iodine may then be extracted with chloroform or carbon tetrachloride using a separating funnel and titrated with sodium thiosulfate. Oxidation states of Mn may be determined by reducing Mn$^{n+}$ to Mn$^{2+}$ with vanadyl sulfate in the presence of sulfuric acid and titrating the remaining vanadyl sulfate with potassium permanganate. (Tsang and Manthiram, 1996).

Chemical compositions of manganese oxyiodides prepared in this example, and having various NaMnO$_4$ to LiI ratios, are listed in Table 1. The chemical analysis data in Table 1 shows that Li content increases and Na content decreases with an increasing amount of LiI in the reaction mixture. The Na content becomes close to zero for a LiI/NaMnO$_4$ ratio greater than or equal to about 5, indicating that very little Na is incorporated into the product at higher concentrations of LiI. Table 1 also shows that the sum of Li and Na content increases initially with increasing LiI in the reaction mixture and becomes essentially constant for a LiI/NaMnO$_4$ ratio greater than or equal to about 5. Samples 5 and 6, which were obtained with a LiI/NaMnO$_4$ ratio of, respectively, 5 and 10 show nearly the same values of Li and Na contents. This suggests that the amount of Li that can be incorporated per Mn during the synthesis process may reach a maximum limit for a LiI/NaMnO$_4$ ratio greater than or equal to about 5.

The data in Table 1 also demonstrates that iodine content decreases significantly as the LiI/NaMnO$_4$ ratio increases from about 0.5 to about 1.5 and remains nearly constant thereafter for a LiI/NaMnO4 ratio greater than or equal to about 5. The oxidation state of Mn is around 3.7+, and the decrease in iodine content may be compensated by an increase in oxygen content. The increase in Li and Na contents with increasing amounts of LiI in the reaction mixture may also cause an increase in oxygen content up to a LiI/NaMnO$_4$ ratio of about 5. However, the iodine content may decrease as firing temperature increases, and samples fired in air at 600° C. do not contain iodine. Also, reflections corresponding to Li$_2$MnO$_3$ and Na$_{0.7}$MnO$_2$ may develop for firing temperatures greater than about 300° C. as indicated by X-ray diffraction.

TABLE 1

Chemical Compositions of Manganese Oxyiodides Samples Obtained with Various NaMnO$_4$ to LiI Ratios.

| Sample Number | Molar Ratio of Reactants NaMnO$_4$:LiI | Firing Temperature (° C.)/Atmosphere | Chemical Composition | Oxidation State of Mn | Li/Na ratio |
|---|---|---|---|---|---|
| 1 | 1:0.5 | 250/vacuum | Li$_{0.52}$Na$_{0.96}$MnO$_{2.43}$I$_{0.39}$ | 3.77 | 0.54 |
| 2 | 1:1 | 250/vacuum | Li$_{0.98}$Na$_{0.74}$MnO$_{2.59}$I$_{0.26}$ | 3.72 | 1.32 |
| 3 | 1:1.5 | 250/vacuum | Li$_{1.51}$Na$_{0.51}$MnO$_{2.85}$I$_{0.12}$ | 3.80 | 2.96 |
| 4 | 1:2 | 250/vacuum | Li$_{1.98}$Na$_{0.34}$MnO$_{2.96}$I$_{0.11}$ | 3.71 | 5.82 |
| 5 | 1:5 | 250/vacuum | Li$_{3.17}$Na$_{0.04}$MnO$_{3.37}$I$_{0.10}$ | 3.63 | 79.2 |
| 6 | 1:10 | 250/vacuum | Li$_{3.25}$Na$_{0.01}$MnO$_{3.47}$I$_{0.08}$ | 3.76 | 325 |

EXAMPLE 2

Manganese Oxyiodide Characterization

Figure 1B:
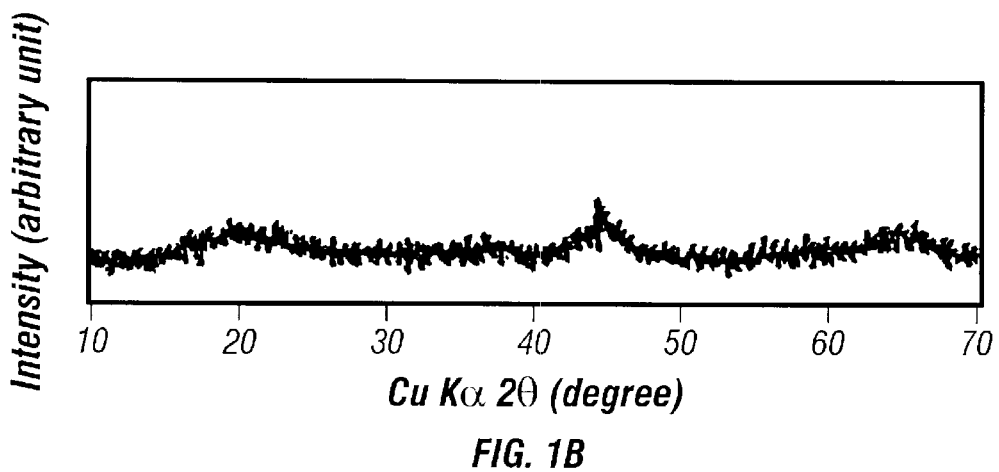
Figure 1C:
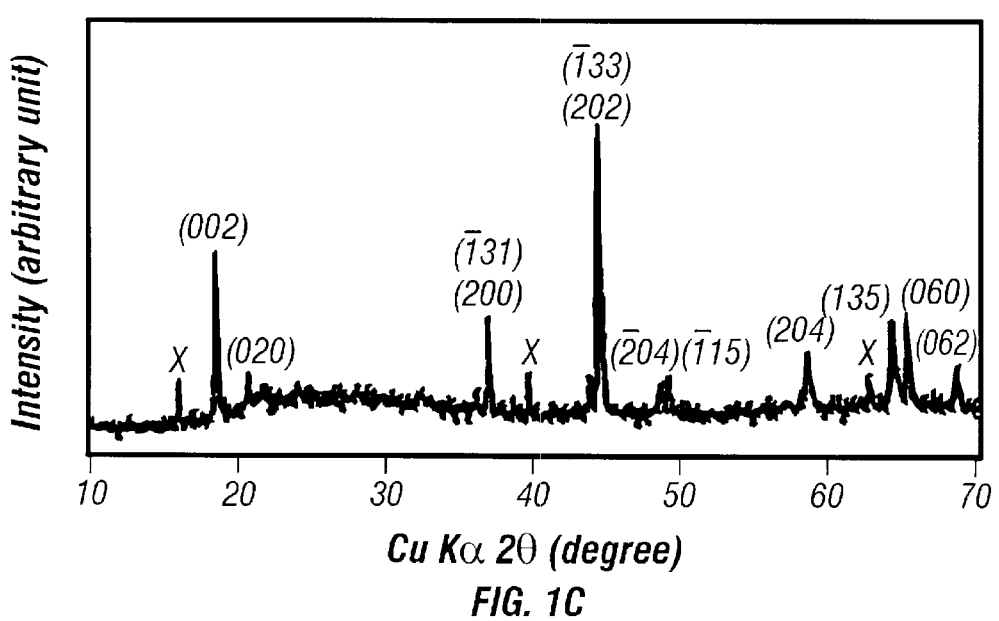

FIG. 1 shows X-ray powder diffraction patterns of a manganese oxyiodide obtained by reducing sodium permanganate with LiI in a molar ratio of 1:1.5 according to the presently disclosed method. Pane (a) of FIG. 1 shows an X-ray diffraction pattern of the manganese oxyiodide as-prepared (i.e. before any annealing steps). Pane (a) indicates that the as-prepared sample is amorphous to X-ray diffraction.

Pane (b) of FIG. 1 shows an X-ray diffraction pattern of an as-prepared manganese oxyiodide after heating in vacuum at about 250° C. for about 10 hours. Pane (b) reveals that the vacuum annealed sample does not show any sharp reflections, indicating that the sample is still amorphous or nearly amorphous to X-ray diffraction.

Pane (c) of FIG. 1 shows an X-ray diffraction pattern of an as-prepared manganese oxyiodide after heating in air at about 600° C. for about 24 hours. Pane (c) demonstrates an observed phenomenon that is typically seen upon annealing in air (or in $N_2$) at temperatures greater than about 300° C. Reflections corresponding to $Li_2MnO_3$ and a small amount of $Na_{0.7}MnO_2$ may be observed in the X-ray diffraction pattern. In pane (c) of FIG. 1, the planes refer to $Li_2MnO_3$, and the asterisks refer to $Na_{0.7}MnO_2$.

Manganese oxyiodides prepared according to the presently disclosed method may also be analyzed in a Transmission Electron Microscope (TEM) to produce a TEM photograph (not shown) and a selected area diffraction (SAD) pattern. SAD patterns (not shown) of a vacuum annealed manganese oxyiodide may exhibit very diffuse rings that suggest that a manganese oxyiodide is not totally amorphous. SAD patterns may indicate that short-range order exists on a length scale of a few Mn—O polyhedra, which is not long-range enough to give a well-defined diffraction pattern. This conclusion is consistent with the existence of a few broad reflections that are reminiscent of $Li_2MnO_3$ reflections in the X-ray pattern of the vacuum annealed manganese oxyiodide shown in pane (b) of FIG. 1. Samples may also be analyzed with surface area analysis tests, such as BET measurements. Vacuum-annealed samples prepared in accordance with the present disclosure were analyzed and found to have a surface area of about 15–20 $m^2/g$.

EXAMPLE 3

Charge/Discharge Characteristics

Figure 2:
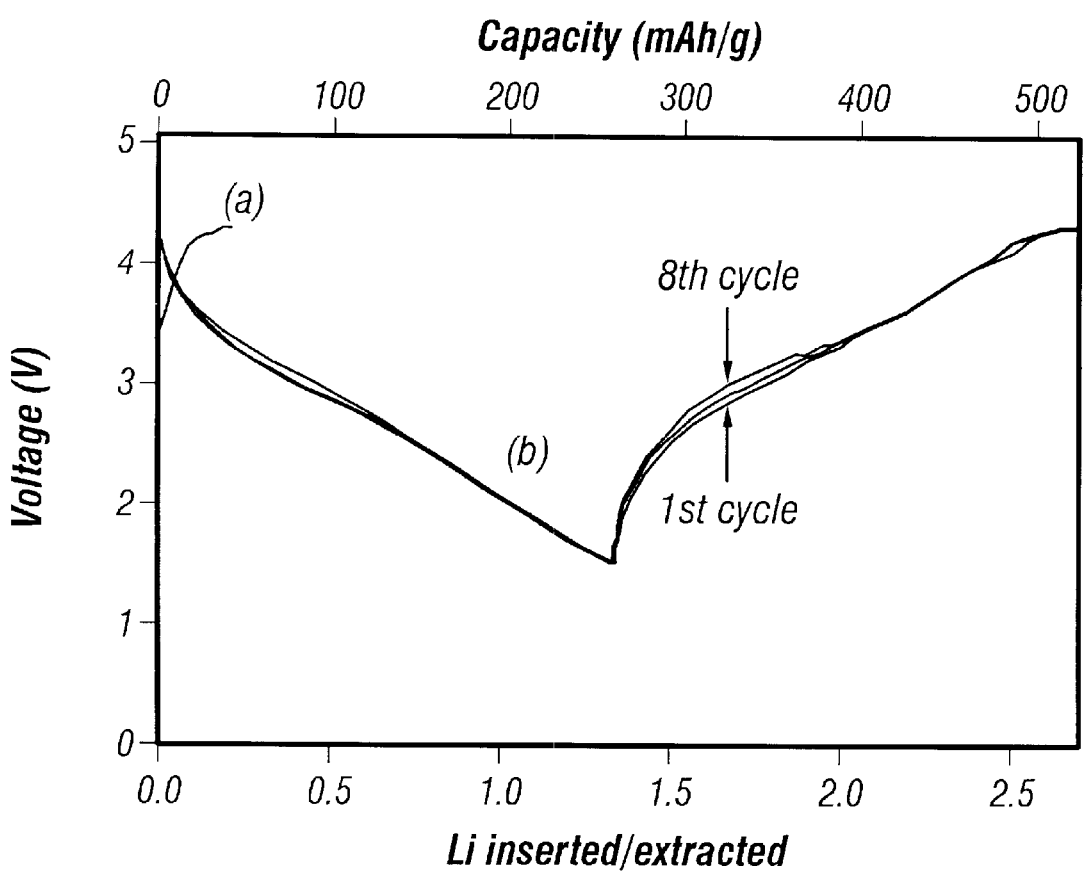
FIG. 2 shows (a) first charge and (b) subsequent discharge-charge curves (8-cycles) of $Li_{1.5}Na_{0.5}MnO_{2.85}I_{0.12}$ recorded with a current density of 0.1 mA/cm$^2$, for an electrode prepared according to one embodiment of the present disclosure.

FIG. 2 shows (a) first charge and (b) subsequent discharge-charge curves (8-cycles) of $Li_{1.5}Na_{0.5}MnO_{2.85}I_{0.12}$ prepared in accordance with one embodiment of the present disclosure. The electrode evaluated in FIG. 2 was prepared by mixing the manganese oxyiodide with carbon in a mortar and pestle. The data were recorded with a current density of 0.1 $mA/cm^2$. The first charge capacity of about 40 mAh/g corresponds to an extraction of about 0.2 Li/Mn. A maximum reversible capacity of about 260 mAh/g corresponding to an insertion/extraction of about 1.3 Li/Mn may be achieved in the approximate range 4.3–1.5 V during subsequent discharge-charge cycles. The data in FIG. 2 indicate about a 100% capacity retention upon cycling.

The nearly amorphous nature of a manganese oxyiodide sample that may be prepared in accordance with the present disclosure may lead to a larger capacity. The amorphous nature may also be particularly useful to avoid common problems that are associated with Jahn-Teller distortion of $Mn^{3+}$. For example, an amorphous structure may smoothly accommodate the distortion without producing a macroscopic phase transition, unlike as may be seen with the spinel $LiMn_2O_4$. Furthermore, macroscopic lattice distortion in $LiMn_2O_4$ may cause a breakdown of contact between particles during cycling and thus result in capacity fading. Additionally, a smooth discharge curve with a uniform slope may help in avoiding problems that may occur with overdischarge or charge.

EXAMPLE 4

Cyclability

Figure 3:
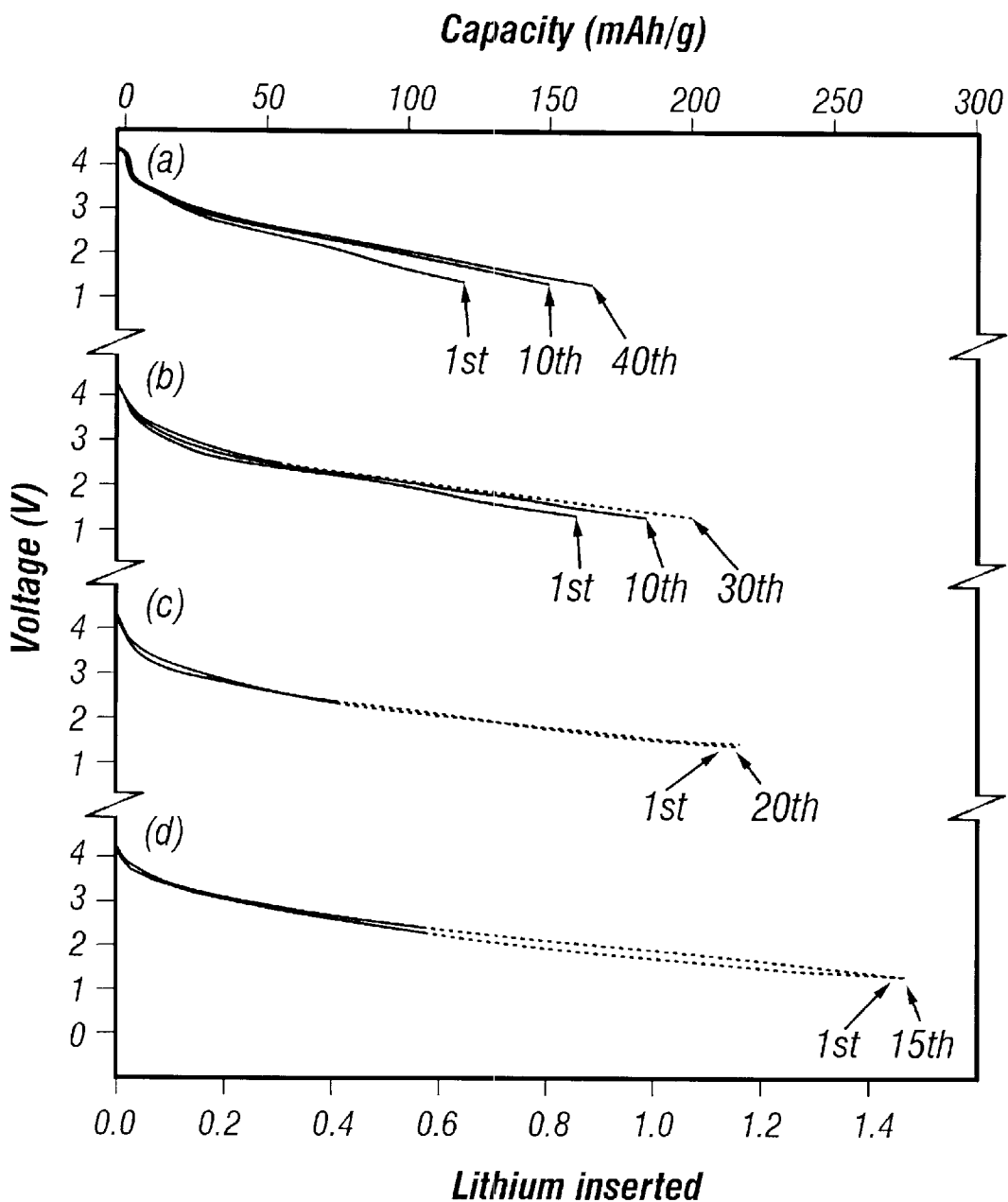
FIG. 3 shows electrochemical cyclability of $Li_{1.5}Na_{0.5}MnO_{2.85}I_{0.12}$ according to one embodiment of the present disclosure for various ball milling times: (a) 5 minutes, (b) 10 minutes, (c) 20 minutes, and (d) 40 minutes. Data were recorded with a current density of 0.5 mA/cm$^2$ after an initial charge to 4.3 V.

FIG. 3 shows electrochemical cyclability of $Li_{1.5}Na_{0.5}MnO_{2.85}I_{0.12}$ for various ball milling times. In pane (a) the ball milling time is 5 minutes, in pane (b) the milling time is 10 minutes, in pane (c) the milling time is 20 minutes, and in pane (d) the milling time is 40 minutes. Data were recorded with a current density of 0.5 m $cm^2$ above a cut off voltage of 1.5 V after an initial charge to 4.3 V. The ordinal numbers refer to the cycle number.

As illustrated by FIG. 3, a first discharge capacity may increase with increasing ball-milling time, and an electrode ball milled for 40 minutes may exhibit the highest capacity. In some cases, ball milling times greater than 40 minutes may cause a decrease in capacity and may lead to unsatisfactory cyclability. In other cases, manganese oxyiodides ball-milled for a shorter time may show a significant increase in capacity on cycling, while samples ball-milled for a longer time may show little increase in capacity. Although not wishing to be bound by theory, these results suggest that a moderate ball-milling time may improve the electrical conductivity through a better dispersion of carbon particles and possibly the Li-ion conductivity through a decrease in particle size of the active material, thereby leading to a better electrochemical utilization of a cathode even during an initial cycle. For shorter ball-milling times, an increase in capacity on cycling may be due to an improvement in the electrochemical utilization of a cathode on cycling.

Figure 4:
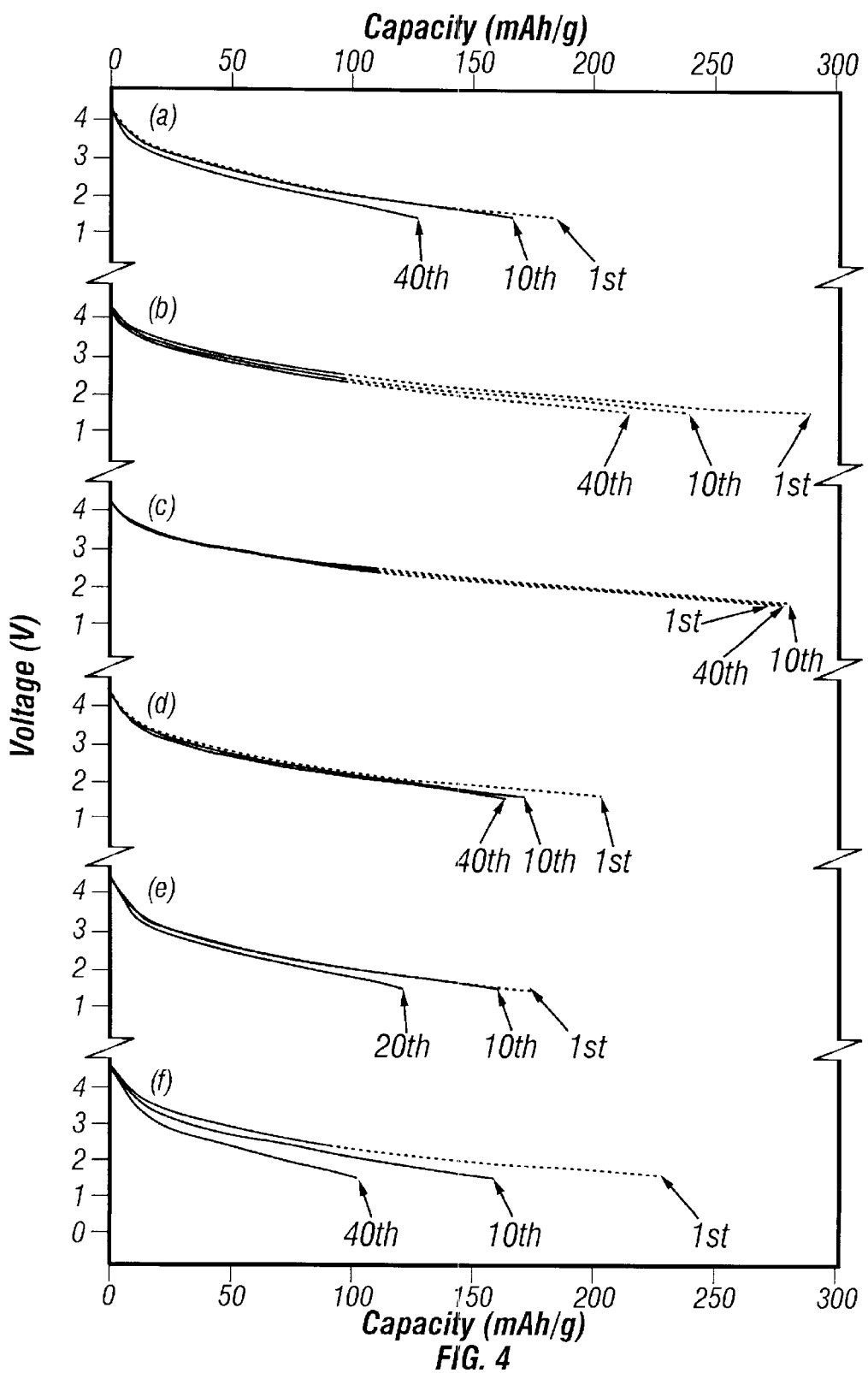
FIG. 4 shows electrochemical cyclability for a constant ball milling time of 40 minutes for: (a) $Li_{0.52}Na_{0.96}MnO_{2.43}I_{0.39}$, (b) $Li_{0.98}Na_{0.74}MnO_{2.59}I_{0.26}$, (c) $Li_{1.5}Na_{0.5}MnO_{2.85}I_{0.12}$, (d) $Li_{1.98}Na_{0.34}MnO_{2.96}I_{0.11}$, (e) $Li_{3.17}Na_{0.04}MnO_{3.37}I_{0.10}$, and (f) $Li_{3.25}Na_{0.01}MnO_{3.47}I_{0.08}$. Data were recorded with a current density of 0.5 mA/cm$^2$ an initial charge to 4.3 V.

FIG. 4 shows electrochemical cyclability for a constant ball-milling time of 40 minutes for manganese oxyiodide compositions of Example 1: (a) $Li_{0.52}Na_{0.96}MnO_{2.43}I_{0.39}$, (b) $Li_{0.98}Na_{0.74}MnO_{2.59}I_{0.26}$, (c) $Li_{1.5}Na_{0.5}MnO_{2.85}I_{0.12}$, (d) $Li_{1.98}Na_{0.34}MnO_{2.96}I_{0.11}$, (e) $Li_{3.17}Na_{0.04}MnO_{3.37}I_{0.10}$, and (f) $Li_{3.25}Na_{0.01}MnO_{3.47}I_{0.08}$. Data were recorded with a current density of 0.5 $mA/cm^2$ in the range 4.3–1.5 V. The data in FIG. 4 show that a first discharge capacity of each of the various samples may increase initially and then decrease with increasing amount of LiI in the reaction mixture. While $Li_{0.52}Na_{0.96}MnO_{2.43}I_{0.39}$, $Li_{0.98}Na_{0.74}MnO_{2.59}I_{0.26}$, $Li_{1.98}Na_{0.34}MnO_{2.96}I_{0.11}$, $Li_{3.17}Na_{0.04}MnO_{3.37}I_{0.10}$, and $Li_{3.25}Na_{0.01}MnO_{3.47}I_{0.08}$ show a decline in capacity on cycling, $Li_{1.5}Na_{0.5}MnO_{2.85}I_{0.12}$ exhibits a maximum capacity (about 275 mAh/g) with excellent capacity retention. $Li_{1.5}Na_{0.5}MnO_{2.85}I_{0.12}$ in fact shows about a 1% increase in capacity on cycling for 40 cycles.

EXAMPLE 5

Capacity

Figure 5:
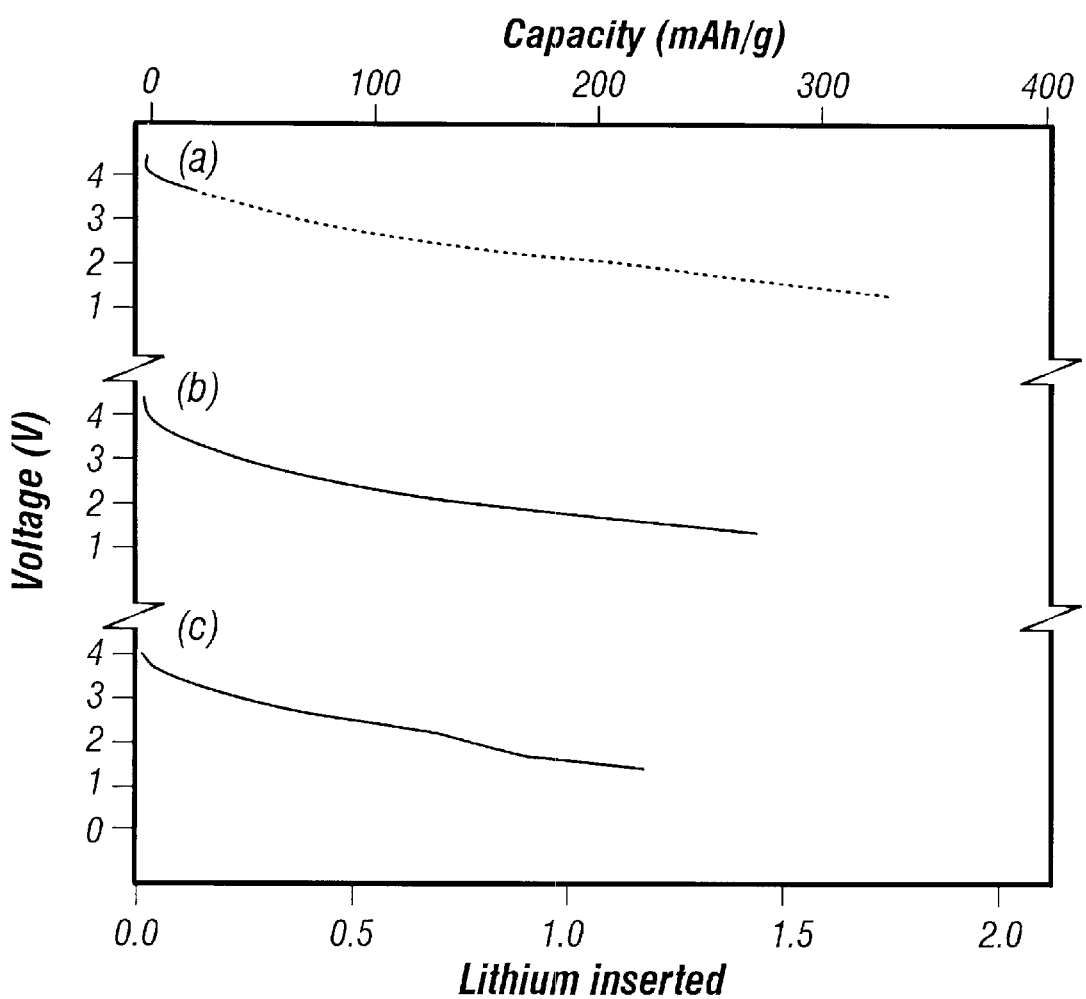
FIG. 5 shows first discharge curves of $Li_{1.5}Na_{0.5}MnO_{2.85}I_{0.12}$ according to one embodiment of the present disclosure recorded after an initial charge to 4.3 V with various current densities: (a) 0.05 mA/cm$^2$, (b) 0.5 mA/,cm$^2$, and (c) 1 mA/cm$^2$.

FIG. 5 shows first discharge curves of the $Li_{1.5}Na_{0.5}MnO_{2.85}I_{0.12}$ of Example 1 recorded after an initial charge to 4.3 V with various current densities: (a) 0.05 $mA/cm^2$, (b) 0.5 $mA/cm^2$, and (c) 1 $mA/cm^2$, with the ball-milling remaining at a constant 40 minutes. As illustrated in FIG. 5, $Li_{1.5}Na_{0.5}MnO_{2.85}I_{0.12}$ exhibits a maximum capacity of about 335 mAh/g at a current density of 0.05 $mA/cm^2$. The capacity decreases to about 275 and about 220 mAh/g upon increasing the current density to, respectively, 0.5 and 1 $mA/cm^2$. Based on these results, it may be observed that the disclosed amorphous manganese oxyiodide exibbits high reversible capacity at higher current densities (0.5 $mA/cm^2$) relative to other manganese oxides. It also exhibits superior electrochemical properties compared to hydrated amorphous oxides reported recently. For example, while the manganese oxyiodide prepared in accordance with the present disclosure exhibits a capacity of about 275 mAh/g at 0.5 $mA/cm^2$, a typical hydrated amorphous manganese oxide exhibits about the same capacity (278 mAh/g) at a much lower current density (0.2 $mA/cm^2$). More importantly, the manganese oxyiodide of the present disclosure exhibits about a 100% capacity retention at least over 40 cycles, while a typical hydrated amorphous manganese oxides shows a 22% decline in capacity in 10 cycles.

While the present disclosure may be adaptable to various modifications and alternative forms, specific embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims. Further modification and alternative embodiments of this invention will be apparent to those skilled in the art in view of this disclosure.

For instance, various changes may be made in the methods and compositions. Further, use of other reducing agents may give products free from iodine. The sodium lithium manganese oxyiodide described herein may be converted to iodine free, amorphous sodium lithium manganese oxide or lithium manganese oxide by appropriate heat treatments at higher temperatures and for longer times treatment with other chemical agents such as acetic acid, or ion exchange reactions as known in the art. Also, certain features of the invention may be utilized independently of the use of other features, all as would be apparent to one skilled in the art after having benefit of this disclosure.

REFERENCES

The following references, to the extent that they provide exemplary procedural or other details supplementary to those set forth herein, are specifically incorporated herein by reference.

Armstrong and Bruce, *Nature* 381:499–500, 1996.
Burke and Murphy, *Mat. Res. Soc. Symp. Proc.* 339, 375 (1995).
Conway, *J. Electrochem. Soc.* 138, 1539 (1991).
Gummow, Liles, and Thackeray, *Mater. Res. Bull.* 28, 1249 (1993).
Idota, Kubot, Matsufuji, Maekawa, and Miyasaka, *Science* 276, 1395 (1997).
Kim and Manthiram, *Nature* 390, 265 (1997).
Leroux, Guyomard, Piffard, *Solid State Ionics* 80:299–306, 1995.
Manthiram and Tsang, *J. Electrochem. Soc.* 143:L143–L145, 1996.
Manthiram, Dananjay, Zhu, *Chem. Mat.* 6:I601–1602, 1994.
Nagaura and Tazawa, *Prog. Batteries Sol. Cells* 9:209–217, 1990.
Oyama, Tatsuma, Sato, Sotomura, *Nature,* 373:598–600, 1995.
Sato, Noguchi, Demachi Oki, Endo *Science* 264:556–558, 1994.
Scrosati *J. Electrochem. Soc.* 139:2776–2781, 1992.
Scrosati, *Nature* 373:557–558, 1995.
Stein, Keller, Mallouk, *Science* 259:1558–1564, 1993.
Tarascon, McKinnon, Coowar, Bowmer, Amatucci Guyomard, *J. Electrochem. Soc.* 141:1421–1431, 1994.
Thackeray, David, Bruce, Goodenough, *Mater. Res. Bull.* 18:461–472, 1983.
Thackeray, *J. Electrochem. Soc.* 142:2558–2563, 1995.
Thackeray, ShaoHorn, Kahaian, Kepler, Skinner, Vaughey, and Hackney, *Electrochem. Solid State Lett.* 1, 7 (1998).
Tsang and Manthiram, *Solid State Ionics* 89:305–312, 1996.
Tsang and Manthiram, *J. Electrochem. Soc.* 144:520–524, 1997.
Vitins and West, *J. Electrochem. Soc.* 144(8):2587–2592, 1997.
Vogel, In: *A Textbook of Quantitative Inorganic Analysis,* Longmans, London, 348–349, 1955.
Xu, Kinser, Owens, and Smyrl, *Electrochem. Solid State Lett.* 1, 1 (1998).
Zheng and Jow, *J. Electrochem. Soc.* 142, L6 (1995).
Zheng, Cygan, and Jow, *J. Electrochem. Soc.* 142, 2699 (1995).

What is claimed is:

1. A method for synthesizing a manganese oxiodide comprising combining in a solution a permanganate with an alkali metal iodide to form the manganese oxyiodide.

2. The method of claim 1, further comprising annealing said manganese oxyiodide.

3. The method of claim 2, wherein said annealing comprises heating said manganese oxyiodide to a temperature of between about 100° C. and about 300° C.

4. The method of claim 2, wherein said annealing occurs under vacuum conditions.

5. The method of claim 2, wherein said annealing comprises heating said manganese oxyiodide for between about 2 hours and about 3 days.

6. The method of claim 1, wherein said combining occurs at ambient temperature.

7. The method of claim 1, wherein said solution is nonaqueous.

8. The method of claim 1, wherein said permanganate comprises an alkali metal permanganate salt.

9. The method of claim 1, wherein said permanganate comprises at least one of sodium permanganate, lithium permanganate, potassium permanganate, or a mixture thereof.

10. The method of claim 1, wherein said permanganate comprises sodium permanganate.

11. The method of claim 1, wherein said alkali metal iodide comprises at least one of lithium iodide, sodium iodide, potassium iodide, or a mixture thereof.

12. The method of claim 1, wherein said alkali metal iodide comprises lithium iodide.

13. The method of claim 1, wherein said permanganate and said alkali metal iodide are combined in a molar ratio of from about 1:0.5 to about 1:10.

14. The method of claim 1, wherein said manganese oxyiodide comprises $Li_wNa_xMnO_yI_z$, wherein said w is between about 0.0 and about 5.0, said x is between about 0.0 and about 5.0, said y is between about 1.0 and about 4.5, and said z is between about 0.0 and about 3.0.

15. The method of claim 1, wherein said manganese oxyiodide comprises $Li_wNa_xMnO_yI_z$, wherein said w is between about 0.5 and about 3.25, said x is between about 0.01 and about 1.0, said y is between about 2.4 and about 3.6, and said z is between about 0.01 and about 0.4.

16. A method for preparing a composition, comprising:
combining an alkali metal permanganate salt with an alkali metal iodide in a nonaqueous medium to form a manganese oxyiodide, wherein said alkali metal permanganate salt and said alkali metal iodide are combined in a molar ratio of from about 1:0.5 to about 1:10; and
heating said manganese oxyiodide under vacuum conditions to a temperature of between about 100° C. and about 300° C. to form the composition.

17. The method of claim 16, wherein said manganese oxyiodide is heated for between about 2 hours and about 3 days.

18. The method of claim 16, wherein said alkali metal permanganate salt comprises sodium permanganate.

19. The method of claim 16, wherein said alkali metal iodide comprises lithium iodide.

20. The method of claim 16, wherein said nonaqueous medium comprises acetonitrile.

21. The method of claim 16, wherein said alkali metal permanganate salt and said alkali metal iodide are combined in a molar ratio of about 1:1.5.

22. A method for forming an electrode, comprising:
  combining in a solution a permanganate with an alkali metal iodide to obtain a manganese oxyiodide;
  heating said manganese oxyiodide; and
  grinding said manganese oxyiodide to form the electrode.

23. The method of claim 22, wherein said permanganate comprises an alkali metal permanganate salt.

24. The method of claim 22, wherein said permanganate comprises sodium permanganate.

25. The method of claim 22, wherein said alkali metal iodide comprises lithium iodide.

26. The method of claim 22, wherein said solution is nonaqueous.

27. The method of claim 22, wherein said solution comprises at least one of alcohol, acetonitrile, or mixtures thereof.

28. The method of claim 22, further comprising mixing said manganese oxyiodide with a conducting material.

29. The method of claim 28, wherein said conducting material comprises carbon.

30. The method of claim 22, further comprising mixing said manganese oxyiodide with a binding material.

31. The method of claim 22, wherein said grinding comprises ball milling.

32. The method of claim 31, wherein said manganese oxyiodide is ball milled with between about 5 weight percent carbon and about 40 weight percent carbon.

33. The method of claim 31, wherein said manganese oxyiodide is ball milled with about 25 weight percent carbon.

34. The method of claim 31, further comprising ball milling said manganese oxyiodide with between about 1 weight percent and about 20 weight percent polytetrafluoroethylene.

35. The method of claim 31, further comprising ball milling said manganese oxyiodide with about 5 weight percent polytetrafluoroethylene.

\* \* \* \* \*

UNITED STATES PATENT AND TRADEMARK OFFICE
CERTIFICATE OF CORRECTION

PATENT NO.     : 6,331,282 B1  
DATED          : December 18, 2001  
INVENTOR(S)    : Manthiram et al.

Page 1 of 1

It is certified that error appears in the above-identified patent and that said Letters Patent is hereby corrected as shown below:

<u>Column 12,</u>
Line 60, please delete "300º C." and insert -- 300º C -- therefor.

Signed and Sealed this

Twenty-fourth Day of December, 2002

JAMES E. ROGAN
*Director of the United States Patent and Trademark Office*